US 011379929B2

(12) United States Patent
Roebuck et al.

(10) Patent No.: US 11,379,929 B2
(45) Date of Patent: Jul. 5, 2022

(54) ADVICE ENGINE

(71) Applicant: HRB Innovations, Inc., Las Vegas, NV (US)

(72) Inventors: Eric Roebuck, Shawnee, KS (US); Jason Houseworth, Olathe, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 611 days.

(21) Appl. No.: 14/836,641

(22) Filed: Aug. 26, 2015

(65) Prior Publication Data

US 2017/0061548 A1 Mar. 2, 2017

(51) Int. Cl.
*G06Q 40/00* (2012.01)

(52) U.S. Cl.
CPC .................. *G06Q 40/123* (2013.12)

(58) Field of Classification Search
CPC ...................................... G06Q 40/123
USPC ....................................... 705/31, 35
See application file for complete search history.

(56) References Cited

U.S. PATENT DOCUMENTS

| | | | | |
|---|---|---|---|---|
| 7,539,635 | B1* | 5/2009 | Peak ...................... | G06Q 10/00 705/31 |
| 2005/0038722 | A1* | 2/2005 | Throndson ............. | G06Q 50/26 705/31 |
| 2006/0271451 | A1* | 11/2006 | Varughese ............. | G06Q 40/02 705/31 |
| 2008/0162310 | A1* | 7/2008 | Quinn .................... | G06Q 10/10 705/31 |
| 2011/0258195 | A1* | 10/2011 | Welling .................. | G06K 9/72 707/740 |
| 2012/0109792 | A1* | 5/2012 | Eftekhari ............... | G06Q 40/02 705/31 |
| 2012/0317481 | A1* | 12/2012 | Armstrong .......... | G06F 3/04842 715/707 |
| 2014/0180883 | A1* | 6/2014 | Regan ................... | G06Q 40/123 705/31 |
| 2016/0078567 | A1* | 3/2016 | Goldman ............. | G06Q 40/123 705/31 |
| 2016/0180470 | A1* | 6/2016 | Mascaro ............ | G06Q 10/0639 705/7.38 |
| 2017/0004583 | A1* | 1/2017 | Wang ................... | G06Q 40/123 |

* cited by examiner

*Primary Examiner* — William E Rankins
(74) *Attorney, Agent, or Firm* — Erise IP, P.A.

(57) ABSTRACT

System, method and media for the provision of relevant information, tax regulations and other advice for the preparation of the return to the user of the tax preparation system. This can be done by developing a profile of the taxpayer as the user moves through the process of preparing the tax return. When a user views a tip or help article, the impact on the outcome of the return is noted. If the impact is a positive one, then the tip or help article may be automatically presented to future users with similar taxpayer profiles. In this way, users can maximize the benefit of the return for the taxpayer while increasing the accuracy of the prepared return.

18 Claims, 4 Drawing Sheets

ADVICE ENGINE

RELATED APPLICATIONS

This non-provisional patent application shares certain subject matter with earlier-filed U.S. patent application Ser. No. 14/630,012, filed Feb. 24, 2015, and entitled SIMPLIFIED TAX INTERVIEW. The identified earlier-filed patent application is hereby incorporated by reference in its entirety into the present application.

BACKGROUND

1. Field

Embodiments of the invention generally relate to systems for the preparation of tax returns and, more particularly, to the provision of relevant information, tax regulations and other advice for the preparation of the return to the user of the tax preparation system.

2. Related Art

The process of preparing a tax return is a notoriously complex and error-prone one. The complexity of the tax code means that simple questions can be surprisingly difficult to answer correctly. Furthermore, some questions have answers which are superficially correct, but which can result in errors in the return being prepared or in a smaller refund than the taxpayer would otherwise be entitled to.

To ensure correct returns and minimize tax liability for their users, makers of tax preparation systems offer tips and/or advice for specific tax return entries or tax interview questions, so that users who are confused or uncertain about specific questions can have additional information or help for that question. However, some users may not know that they need advice for a particular question. Furthermore, providing all tips to all users would overwhelm users with too much information, and the most relevant tips will vary from user to user. Accordingly, there is a need for a tax preparation system that can automatically prompt users with only those tips and help articles that will positively affect the user's return.

SUMMARY

Embodiments of the inventions address the above-described need by developing a profile of the taxpayer as the user moves through the process of preparing the tax return. When a user views a tax tip or help article, the impact on the outcome of the return is noted. If the impact is a positive one, then the tip or help article may be automatically presented to future users with similar taxpayer profiles.

In a first embodiment, the invention includes a system for presenting relevant tax information to a user, comprising a data store storing a plurality of tax returns and tax information consulted in preparing those returns, a typecasting engine comprising a classifier operable to determine a prototype for a tax return being classified based on values of a plurality of indicator variables associated with the tax return being classified, a data import engine, operable to import tax data for the taxpayer, download one or more tax forms corresponding to the taxpayer, and based on at least the tax data and the tax forms, determine one or more values for the plurality of indicator variables associated with the tax return being classified, and a user interface engine operable to present to the user, automatically and without a request from the user, a relevant item of tax information, wherein the relevant item of tax information is determined based on the prototype determined by the classifier.

In a second embodiment, the invention includes a method of presenting relevant tax information to a user, comprising the steps of importing prescreen data associated with a tax return being prepared, comparing said prescreen data to predetermined values for a plurality of indicator variables, based on said step of comparing, identifying a prototype for a taxpayer associated with the tax return, determining, based on the prototype, an item of tax information relevant to the tax return, and presenting to the user, automatically and without a request from the user, the item of tax information.

In a third embodiment, the invention includes one or more computer-readable media storing computer-executable instructions which, when executed by computer perform a method of determining items of tax information relevant to a taxpayer prototype, comprising the steps of importing tax data relating to a plurality of previously prepared tax returns from a data store storing said tax data, said tax data including items of tax information consulted during the preparation of said previously prepared tax returns and an impact for each of the items of tax information, applying cluster analysis to said tax data to generate a plurality of clusters, each of said clusters including a plurality of previously prepared tax returns, based on said clusters, determining a plurality of prototypes, for each prototype, determining one or more indicator variables corresponding to said prototype and one or more relevant items of tax information for said prototype, and storing said prototypes, said indicator variables, and said relevant items of tax information in a prototype data store.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention act to determine relevant and helpful tax tips and help articles for an individual taxpayer. To make this determination, one or more prototypes are determined for the taxpayer's tax return based on information either already known before the tax interview is presented or gathered during presentation of the tax interview. As discussed in detail below, a prototype is one or more underlying characteristics associated with a tax return that informs the relevant tax tips and help items for that return. These prototypes can be automatically generated by, for example, monitoring the preparation of prior returns. As described in detail below, the prototype for a return can be determined based on any aspect of the return preparation process or the resulting return.

In addition to determining the prototype or prototypes applicable to a return as it is being prepared, the tax tips or help topics consulted during the preparation of the return are monitored, together with their impact on the return. If the user changes or adds an entry after viewing a particular tax tip or help topic, then that tax tip or help topic is marked as being helpful for the prototype or prototypes of that return. Particularly helpful items of tax information may then be automatically presented to future returns matching that prototype without their preparers needing to ask for them.

As more concrete example, a first user preparing a return searches for "day care expenses" when completing the dependents section of the tax interview and is presented with an article about deducting childcare costs. The user then enters their day care expenses, and their return increases by $400. Subsequently, when another user is preparing a similar return and reaches the dependents section of the tax interview, they may automatically be presented with the article without needing to search for it.

It should be appreciated that the tax situation and tax data items discussed herein relate to a particular taxpayer, although a user of the invention may be the taxpayer or a third party operating on behalf of the taxpayer, such as a professional tax preparer ("tax professional") or an authorized agent of the taxpayer. Therefore, use of the term "taxpayer" herein is intended to encompass either or both of the taxpayer and any third party operating on behalf of the taxpayer. Additionally, a taxpayer may comprise an individual filing singly, a couple filing jointly, a business, or a self-employed filer.

As discussed in more detail below, embodiments of the invention present relevant items of tax information to a user with the goal of positively impacting the tax preparation experience. This positive impact may include, without limitation, reducing the tax liability, increasing a taxpayer's refund, decreasing the audit risk for the return being prepared, reducing the time required to prepare the tax return, or reducing the net tax liability for the taxpayer for a future year. As can be appreciated, depending on circumstances for each tax return being prepared, certain items of tax information may or may not be relevant to the particular tax return. As used herein, items of tax information can be sections of tax code, articles, examples, applications of tax law to particular situations, or (more generally) any information that can change a user's response to a tax interview question. An item of tax information is a relevant item of tax information if it is likely to have a positive impact, as described above. The terms "tax tip" and "help article" may be used herein as shorthand to refer to relevant items of tax information. A tax tip is broadly a shorter item of tax information may be presented to the user as a pop-up, fly-out, or other inline presentation. A help article is broadly a longer item of tax information that is typically presented on a separate page or in a separate window from the relevant tax interview question.

As used herein, the "impact" of an item of tax information is the change in the outcome of the tax return as a result of the user complying with that item of tax information when it is relevant. For example, where a user takes an additional deduction based on the item of tax information, the impact of that item of tax information may be the decrease in net tax liability (e.g., a $100 higher refund). Similarly, if a tax tip enables a user to skip a portion of the tax interview, then the impact of that tax tip may be the reduction in the time needed to prepare the return. Other items of tax information may have other impacts including reduced audit risk, improved results for future tax returns (e.g., improved depreciation of assets), or an otherwise simplified tax return.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Operational Environment for Embodiments of the Invention

Figure 1:
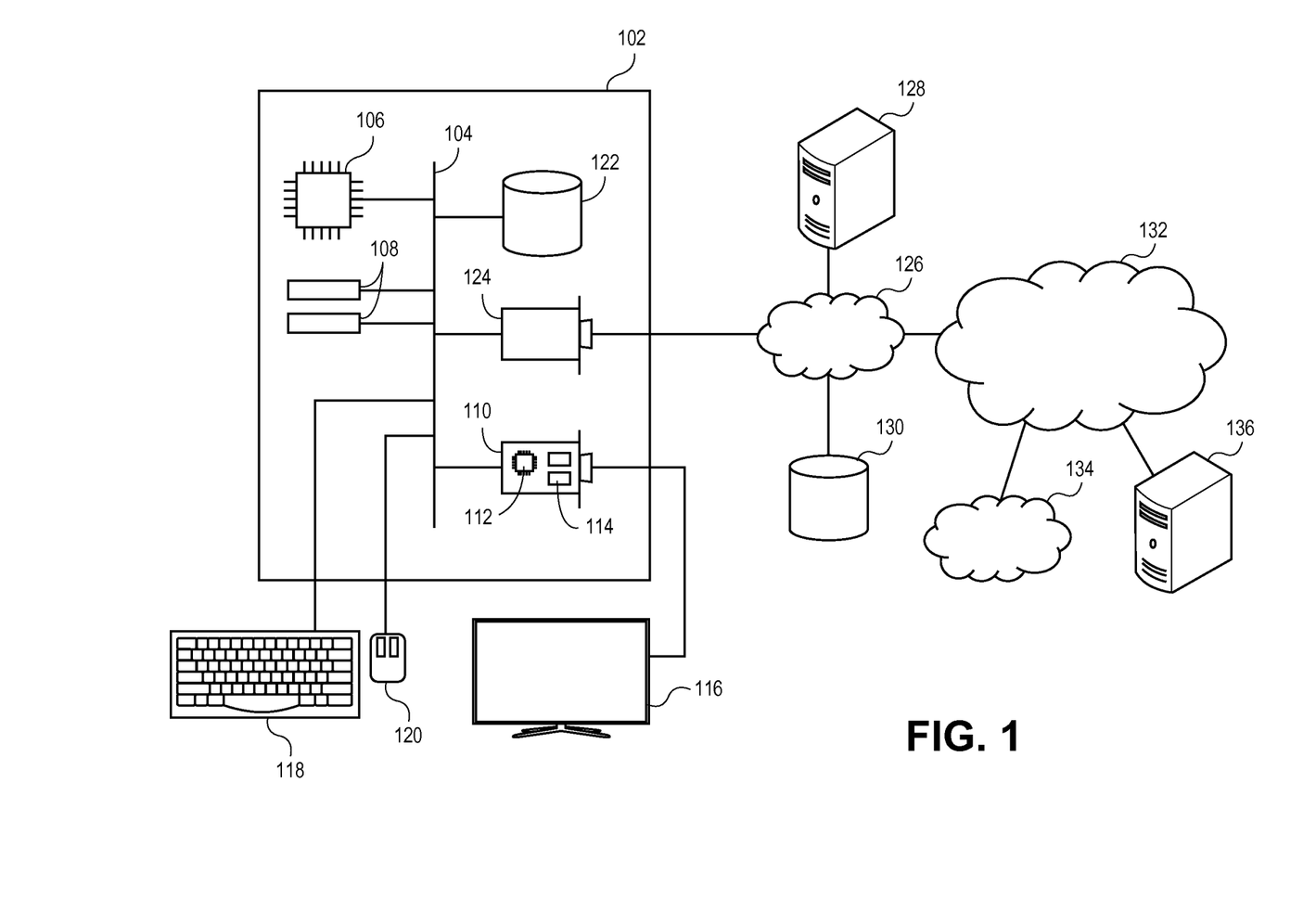
FIG. 1 depicts an exemplary hardware platform for certain embodiments of the invention.

Turning first to FIG. 1, an exemplary hardware platform that for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110.

In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Operation of Embodiments of the Invention

Broadly, embodiments of the invention classify returns being prepared so that similar returns can be identified, track the effects of viewed tax tips and help articles on returns being prepared, and analyze the collected information so as to automatically present helpful tax tips and help articles for the return being prepared without the user needing to search for them.

Figure 2:
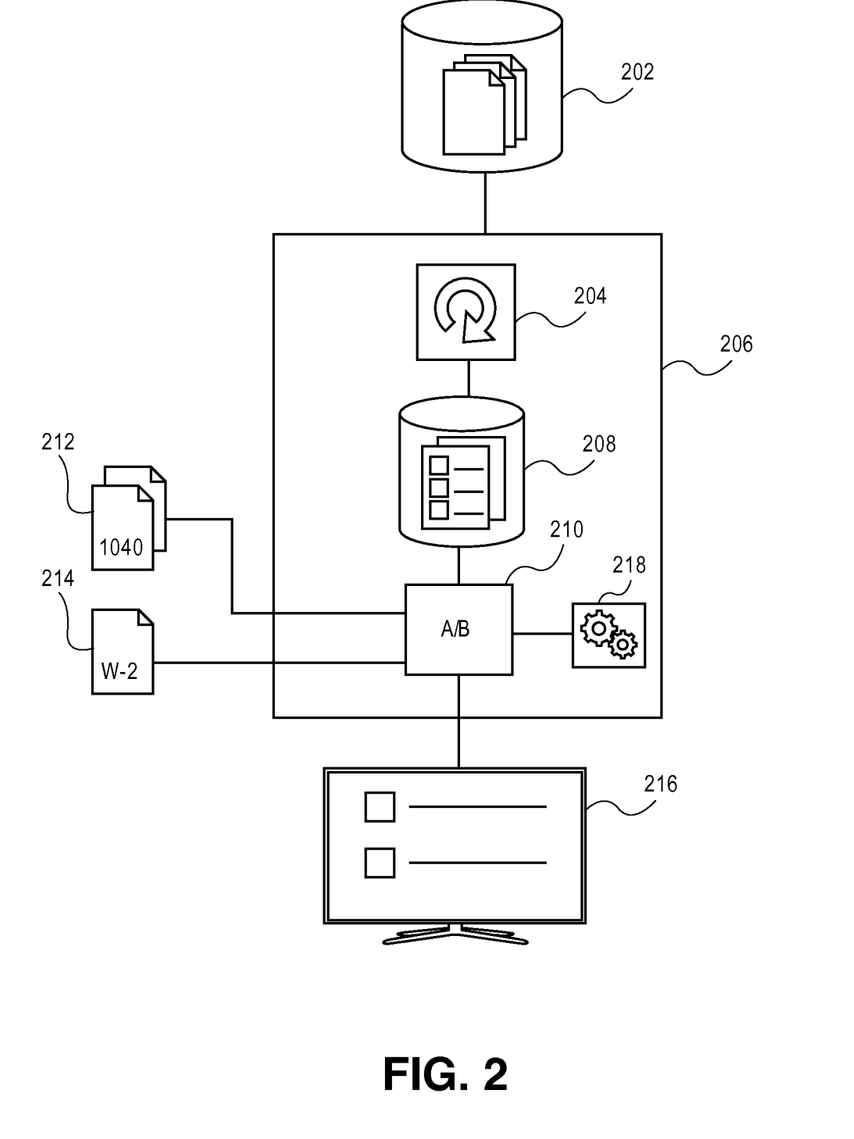
FIG. 2 depicts a system suitable for practicing certain embodiments of the invention.

Turning now to FIG. 2, a system suitable for practicing certain embodiments of the invention is depicted. In order to determine which returns are similar to a return being prepared, embodiments of the invention include a typecasting engine that statistically analyzes a large volume of previously filed tax returns from a plurality of disparate taxpayers. The typecasting engine broadly comprises a statistical analyzer 204, a prototype data store 208, and a classifier 210. The goal of the typecasting engine is to identify prototypes that, when relevant to an individual taxpayer or tax return, indicate that the same set of help articles and tax tips would likely be useful in preparing any return to which the prototype applies. The typecasting engine then stores the identified prototypes in the prototype data store for retrieval during preparation of a subsequent tax return, as discussed below.

As briefly noted above, a prototype is one or more underlying characteristics of a tax return that informs or influences the set of tax tips or help articles that would have a positive impact on the tax return being prepared. Thus, each prototype may have a set of tax tips and help items that should be presented to the user when the return being prepared falls into that prototype. Each prototype has an associated set of indicator variables (corresponding to items of tax data) that determine which returns fall into that prototype. As a high-level example, one prototype might be "both parents work" (i.e., whether the taxpayer is married with children, and both the taxpayer and his spouse work at least part time). The corresponding indicator variables would then include the taxpayer's filing status (e.g., married filing jointly, single, head of household, etc.) and wage income, as well as the taxpayer's spouse's wage income and the number of dependents. Thus, the indicator variables are specific types of items of tax data (e.g., filing status or wage income); the item of tax data itself is the quantitative value associated with the indicator variable for a particular tax return (e.g., married filing jointly or wage income of $75,000); and the prototype is the underlying characteristic associated with the tax return that would inform whether certain tax tips or help articles would be helpful in preparing the return (e.g., whether "both parents work). It should further be appreciated that items of tax data are not limited to information entered on a tax form; rather, they include any information used in the course of preparing the return, and can be derived from other items of tax data.

Embodiments of the invention then use the values of these indicator variables for a given tax return to determine whether the prototype applies to that return. In the above example, classifier would determine that the "both parents work" prototype applies to the return being classified if, for example, the filing status is married filing jointly, the taxpayer claims at least 1 dependent, and the taxpayer and the taxpayer's spouse both report wage income of at least $12,000. If the system knows that this prototype applies to the return being prepared, then it can prompt the user that day-care expenses are tax deductible without the need for the user to search for "day-care expenses" in the dependents section of the tax interview.

As the previous example illustrates, some prototypes (and the associated indicator variables, tax tips, and help articles) may be semantically linked without being imposed by the tax code (i.e., day care expenses are more likely to be relevant to a couple claiming dependents than to a couple with no children). In other cases, the prototypes, indicator variables, and tax tips and help articles may be directly imposed by the tax code. For example, if a taxpayer is ineligible for a Roth IRA by virtue of their income level, tax tips and help articles about Roth IRAs are unlikely to be helpful. Still other prototypes may not have such a direct, semantic connection between the indicator variable and the relevant tax tips or help articles. For example, a particular income level in combination with a particular number of dependents may indicate that tax tips and help articles about home office deductions should be presented in the interview. These examples are purely illustrative and are not intended to be limiting. A person of skill in the art will appreciate that a single indicator variable may be associated with multiple prototypes and vice versa, and that a particular tax tip or help article may be relevant for multiple prototypes.

When embodied as a system, the invention includes components for storing and analyzing a large volume of previously filed tax returns to generate a number of prototypes and determine indicator variables corresponding to each prototype. The tax tips and help articles reviewed during the preparation of each return, and their impact on that return can also be stored, either together with the prototypes or separately. Such embodiments of the invention further include components for importing tax data associated with the taxpayer from prior returns or from downloaded tax forms, and for analyzing the tax data to determine which prototype or prototypes satisfy the return being prepared. Such embodiments of the invention also include user interface components for presenting tax tips and help articles to users once the appropriate prototype or prototypes have been identified.

In particular, in FIG. 2, a data store 202 stores a number of previously prepared tax returns. In embodiments of the invention, the stored previously prepared tax returns are for a plurality of different taxpayers. These returns may be for prior tax years or for the current year. More recent returns may be preferentially used to provide more accurate classifications in light of changing tax law. In some embodiments, tax tips and help articles reviewed during the preparation of each return, and their impact on that return, are also stored. In some embodiments, the previously prepared tax returns may be anonymized to protect taxpayer privacy. These returns serve as input to statistical analyzer 204 of typecasting engine 206. As noted above, typecasting engine 206 broadly comprises statistical analyzer 204, prototype data store 208, and classifier 210. A person of skill in the art will appreciate that many different arrangements and distributions of these components is possible within the scope of the invention.

Typecasting engine 206 generally performs two functions: a first function is to populate the prototype data store 208 with prototypes identified by statistical analyzer 204; and a second function is to determine which tax tips and help articles are likely to be helpful for an individual taxpayer by classifying using classifier 210 the taxpayer's tax return according to prototypes associated with the tax return. Discussing now the first general function of the typecasting engine 206, the purpose of statistical analyzer 204 is to determine prototypes for returns and indicator variables associated with those prototypes. A person of skill in the art will appreciate that such a calculation, particularly on a large data set, is only possible with the aid of computer-assisted statistical techniques such as multivariate analysis and/or cluster analysis. As described above, each prototype can be thought of as a rule for determining a set of tax tips likely to be helpful for a tax return being prepared, and the indicator variables can be thought of as the factors on which the rule is based. Statistical analyzer 204 automatically infers these rules and factors based on historical return data and other sources.

In particular and in one embodiment, a cluster analysis technique such as density-based clustering can be employed. In general, cluster analysis is the study of how to group a set of objects in such a way that similar objects are placed in the same group. These categories need not be known a priori, or even have any semantic meaning associated with them. Here, the objects are the completed tax returns stored in data store 202, and the resulting clusters become the prototypes. Density-based clustering defines clusters to be areas of higher density in a higher-dimension space representing the various features of the objects. Thus, clusters in this application will contain tax returns that share many similar features. As such, tax tips and help articles found to be helpful for tax returns in the cluster will also be likely to be shared.

In another embodiment, a different technique performed by statistical analyzer 204 for identifying prototypes is biclustering. Biclustering allows the simultaneous clustering of the dependent and independent variables of a data set. In this way, a set of dependent variables (here, tax-data items) that exhibit similar behavior across a set of independent variables (here, for example, tax tips that were found to be helpful) can be identified, and vice versa. These biclusters can then be used to predict the tax tips and help articles that will be relevant for a given tax return being prepared.

Other techniques can also be used by statistical analyzer 204 to predict the tax tips and help articles that are relevant for a given indicator variable or combination of variables. For example, the presence of a given tax form may be determined to reliably correlate to the filing of a particular schedule that benefits from a particular tax tip or help article. Additionally, it will be appreciated that, as additional tax returns are added to data store 202, the set of prototypes and indicator variables can be refined by re-analyzing the larger data set to improve accuracy. Accordingly, statistical processor 204 may regularly re-calculate the prototypes and indicator variables based on the most current data. The combined set of prototypes and indicator variables is stored in data store 208 for subsequent use by classifier 210.

In some embodiments, data store 208 may be further augmented by empirically determined prototypes and indicator variables. For example, if statistical analyzer 204 did not generate the "Roth-ineligible" prototype described above (perhaps due to a small number of previous returns that matched the prototype), it could be manually added to the database after statistical analyzer 204 has analyzed the returns in data store 202 but before classifier 210 determines prototypes based on prescreen data.

Discussing now the second general function of the typecasting engine 206, classifier 210 broadly determines which prototypes apply to a particular taxpayer's tax return. Regardless of the statistical analysis technique used by statistical analyzer 204, classifier 210 can assign each return to soft clusters, representing a likelihood that the return belongs to a given cluster. If the likelihood that a return falls into a particular cluster is above a given threshold, then the corresponding prototype can be assigned to that return. In some embodiments, the threshold is such that a plurality of clusters have likelihoods that fall above the threshold for the return, and as such, a plurality of prototypes are assigned to the return and the tax tips and help articles for all of them are presented to the user. As such, the threshold for assigning a prototype to a return becomes a parameter that can be used to adjust the trade-off between overwhelming the user with tax tips and help articles and potentially omitting an important one.

Classifier 210 begins by ingesting the data for the return being classified using a data import engine component. Data for the return being classified may be prescreen data (i.e., information which is known or can be determined before the tax interview begins), interview data (i.e. information gathered during the tax interview) or tax data (i.e., data from tax forms that is directly used to prepare the return). It is the function of data import engine 218 to interface with the wide variety of systems from which it can be retrieved. For example, data import engine 218 may interface with the storage for user profiles, various tax form providers including financial institutions, financial service providers, etc. and/or a historical tax return data store. Data import engine 218 communicates with these internal and external components to retrieve the raw data and convert it into a standard form useable by classifier 210. In some embodiments, this conversion takes the form of determining the values associated with various indicator variables. Prescreen data can also be derived from the user's profile, which contains basic demographic information about the user that is less likely to change from year to year.

Examples of information that may be contained in the user's profile include the user's name, taxpayer identification number, date of birth, marital status, dependent information, and so forth. In some embodiments, a user is prompted for updates to the profile information they have previously entered during the prescreen process. In some such embodiments, a user may specify that certain profile items will not change and should not be prompted for updates in the future. For example, once a user reaches a certain age, they may decide that their dependent information will never again change. Additionally, some profile items such as date of birth and taxpayer identification number may always be unchanging and never require updates. Profile items may also be imported from prior year tax returns 212, as may be the case if the user has not previously created a profile. Changes in profile data items may be relevant in themselves. For example, a change in address as compared to the prior tax reporting period may indicate that the return satisfies a "recently moved" prototype so that tax tips and help articles relating to moving expenses should be presented. In some embodiments, data import engine can obtain prescreen data from financial institution systems and financial services providers by providing a login screen for the taxpayer's account, and then automatically importing account information if the login is successful.

Also used by classifier 210 is tax data that may be derived from tax forms 214 for the current tax reporting period that have been imported from one or more tax form providers. In some embodiments, classifier 210 includes a dedicated submodule for importing tax forms from a variety of tax form providers, including payroll processors, banks, investment companies, government tax authorities, and other sources. Such imported forms include data useable for classification information both in the form of the actual tax data as well as additional demographic information about the taxpayer. For example, a wage statement (such as a W-2 in the United States) may include information including the taxpayer's full name and address in addition to the income information.

Still more information useable by classifier 210 may be inferred based on known data alone or in combination with external data sources. For example, to determine a "farmer" prototype, the taxpayer's zip code (as entered by the user or imported from a tax form such as a W-2) could be combined with a list of zip codes that have been determined to be rural. Similarly, to determine whether a "natural disaster" prototype is applicable, the zip code can be combined with a list of zip codes in which natural disasters have occurred in the prior tax-reporting period.

In addition, the immediate source for tax data items may itself be another source of classification data. For example, a wage statement (such as a W-2 statement in the United States) that can be automatically imported or downloaded from a payroll processor may cause the return to satisfy different prototypes from the same wage statement manually entered by the user, and a hand-written wage statement may cause the return to satisfy a third set of prototypes, even if all three wage statements contain the same wage data.

In some embodiments, additional data can be imported from other sources. Classifier 210 may interface with one or more ways of tracking tax data throughout the year in order to import additional tax and prescreen data. As a first example, financial management software may track charitable donations or business expenses. As another example, a tax preparation service may provide a smartphone application for tracking tax-relevant receipts and/or cash payments as they arise over the course of tax year. This data may be gathered in structured or unstructured form. The former case requires more effort by the taxpayer as it is entered, but less effort during the tax preparation process.

Once all the initial classification data has been entered, imported, and/or inferred, classifier 210 makes an initial determination as to which, if any, prototypes apply to the current return. The precise operation of classifier 210 will depend on the type of analysis techniques used by statistical analyzer 204. In general, each type of analysis technique will have a corresponding classifier to determine to which, if any, clusters the current return belongs. As described above, the classifier may use either hard clustering or soft clustering. For further discussion, the reader is referred to a text covering cluster analysis and classification such as Cluster Analysis, Fifth Edition by Everitt, et al., which is hereby incorporated by reference.

The initial determination of prototypes can be used to present tax tips and help articles during the tax interview. However, over the course of the tax interview, the classifier may continue to update the classification of the return being prepared, determining additional prototypes or removing previously determined prototypes. Thus, when the user begins the tax interview using interface engine 216, a certain set of prototypes may be assigned to the return, indicating that a particular set of tax tips or help articles should be presented to the user. As the user completes the tax interview (potentially with the assistance of some or all of the tax tips or help articles presented to the user by interface engine 216) the set of prototypes can be refined, thereby changing the set of tax tips and help articles which will be presented to the user in subsequent sections of the tax interview.

Once the user uses user interface engine 216 to provide responses to the set of questions provided in the interview, a tax preparation engine, as is known in the art, can use the responses in combination with the collected prescreen data to complete the tax return. However, for any tax preparation engine, the return prepared can only be as good as the responses given to the tax interview. Because the user has been guided by the tax tips and help articles presented by embodiments of the invention and which the user might not have otherwise known to search for, the return prepared will be of a much higher quality than would otherwise be possible.

Figure 3:
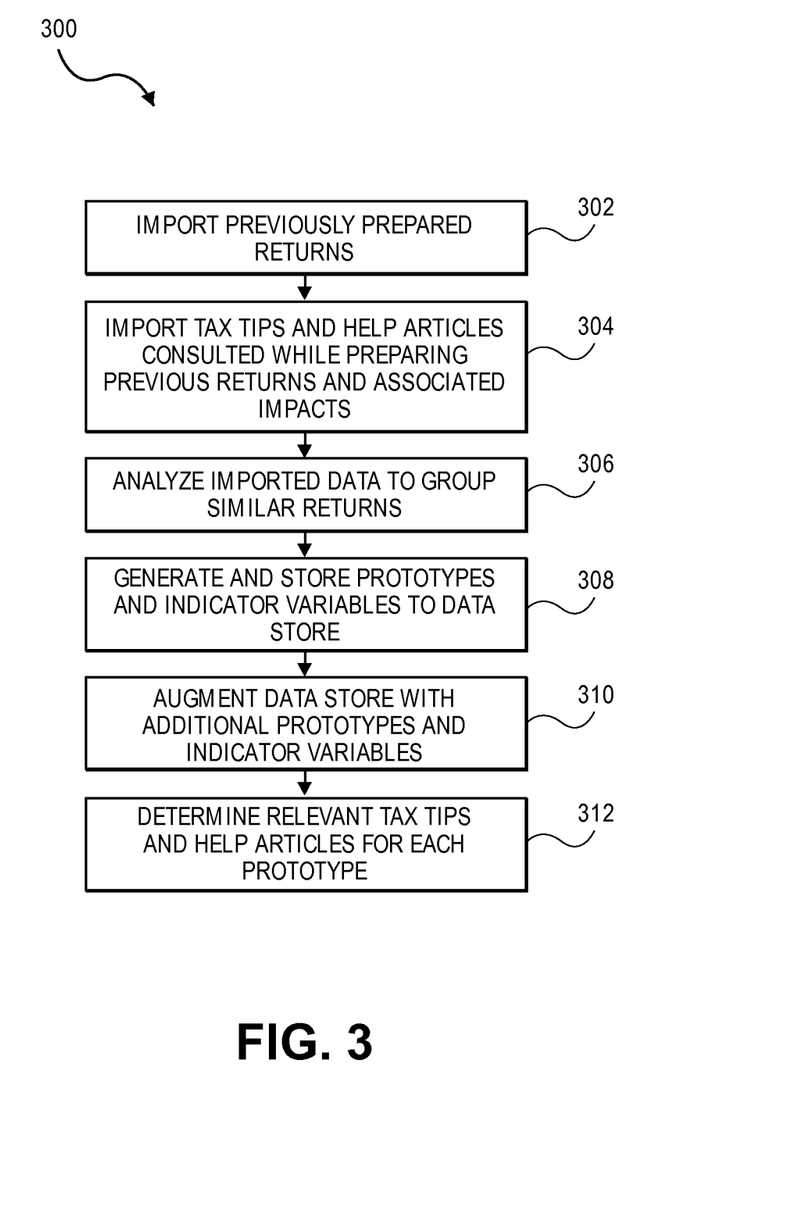
FIG. 3 depicts a flowchart illustrating the operation of one embodiment of the invention.

Turning now to FIG. 3, a flowchart illustrating the operation of one embodiment of the invention is depicted, and referred to generally by reference numeral 300. Initially, at step 302, a plurality of previously prepared tax returns 202 is imported by statistical analyzer 204. In some embodiments, tax returns 202 are actual tax returns that have been previously prepared prior to filing. In other embodiments, returns 202 are specially prepared training data representing typical taxpayer profiles. In still other embodiments, tax returns 202 represent a mix of actual and synthetic returns. In some such embodiments, synthetic returns are weighted more heavily by statistical analyzer 204 than actual returns. In other embodiments, they are weighted less heavily or equally.

Processing then proceeds to step 304 where the tax tips and help articles consulted during the tax interview that correspond to each of returns 202, together with the impact of each tax tip or help article on the return, are imported by statistical analyzer 204. For example if, as described above, a user deducts day-care expenses on their tax return after reading a help article explaining permissible child-care deductions and thereby increases their return by $400, the impact of that help article would be a $400 higher refund. Similarly, if the user deducts a particular expense, reviews a particular help article, and then removes the deduction, the impact would be a $400 lower refund. Because a user may be subject to penalties and fees if a deduction is mistakenly taken, a decreased refund may, in some embodiments, be as important or more important in determining the impact of the tax tip or the help article. In some embodiment, the user may also be given the opportunity to rate the helpfulness of a tax tip or help article they have viewed, which can also contribute to its impact on the return. In some embodiments, impacts may be normalized for easier comparison, or otherwise not directly based on a dollar change in the refund amount.

For those embodiments where tax returns 202 are actual returns, the corresponding impact may be the actual impact on the return as compared to the state of the return before the tax tip or article was read, they may be automatically generated based on the corresponding returns, or they may be manually entered based on the corresponding returns. For those embodiments where part or all of tax returns 202 are synthetic, the impact may also be synthetic, or it may be calculated by comparing a return that follows the tax tip or help article and one that does not do so. In other embodiments, impacts are not considered at this point, but rather, once the returns are clustered based on the various entries they contain, returns being prepared are classified into the appropriate clusters and then the tax tips and help articles relevant to those clusters are presented.

Next, at step 306, statistical analyzer 204 analyzes the imported data. In some embodiments, statistical analyzer 204 uses some form of cluster analysis. One of skill in the art will appreciate that many different clustering algorithms are possible and may be employed in various embodiments of the invention. For example, biclustering techniques such as SAMBA and FABIA may be appropriate where impact data has been imported or calculated at step 304, while density-based clustering techniques such as DBSCAN and OPTICS may be appropriate where impact data has not yet been calculated. Other cluster analysis and non-cluster analysis techniques, now known or later discovered, may also be used to generate the prototypes and indicator variables, and are considered to be within the scope of the invention.

At step 308, based on the analysis performed at step 306, statistical analyzer 204 generates and stores prototypes and the corresponding indicators in prototype data store 208. The representation of the information stored will, of course, depend on the precise statistical analysis technique used. In some embodiments, the prototypes will be information useable to determine a set of tax tips and/or help articles to present to the user. In other embodiments, the prototypes will be the tax tips and help articles themselves. In still other embodiments, the prototypes will contain information identifying a cluster or clusters of returns, which can be used to determine the relevant tax tips and help articles, as described above, at the time the return in question is being prepared. The indicator variables are broadly one or more pieces of tax

| Relevant Item of Tax Data | Exemplary Impact of Item of Tax Data |
| --- | --- |
| Tax tip that childcare expenses are deductible | $400 increase in tax refund |
| Help article explaining which work-related clothing, laundry and dry-cleaning expenses are deductible | $125 decrease in amount due |
| Pop-ups explaining the advantages of different depreciation schedules for particular assets | Decreased risk of recaptured depreciation adversely affecting future returns |
| Tax tip describing the requirements for filing simplified business income schedule | Reduced time and effort preparing return |
| Warning regarding claiming home-office deductions and suggesting alternate ways to deduct expenses | Reduced audit risk without increased net tax liability |
| Tax tip for new home owners which describe what you can deduct for moving expenses | Increased refund |
| Help article which discusses deductions for teachers for classroom expenses | Increase refund and reduction in audit risk |
| Tax tip for home owners who can claim energy efficient improvements to their home | Increase refund | data common to the returns falling into the cluster corresponding to the associated prototype. In some embodiments, these indicator variables are binary variables; in other embodiments, they are continuous variables. This data store can subsequently be used by classifier 210 to determine the appropriate prototype or prototypes for the return being prepared, as described below.

Processing then proceeds to step 310, where prototype data store 208 is, in some embodiments, augmented with additional prototypes and indicator variables. In some embodiments, these additional prototypes are added where the prior returns falling into the prototype are too varied to automatically generate a robust set of indicator variables. In other embodiments, the additional prototypes may be sufficiently rare that the set of prior returns 202 does not include enough returns to accurately categorize them. In still other embodiments, the additional prototypes may be considered sufficiently important that it is considered worthwhile to specially create a set of indicator variables for them. In yet other embodiments, all known prototypes are used to augment data store 208, regardless of whether a similar prototype has been generated by statistical analyzer 204, so as to offer the most complete set of tax tips and help articles likely to be helpful for a tax return being prepared.

Finally, at step 312, one or more tax tips and/or help articles are determined that are relevant to each of the prototypes. For those embodiments where tax tip and help article impacts are imported for each of prior returns 202, this may be a separate commonality analysis for the sets of impacts in the cluster corresponding to the prototype. If biclustering is used to analyze the prior return data, the relevant tax tips and help articles may be automatically generated as a part of that analysis. In some embodiments, the relevant tax tips and help articles are instead determined during the process of preparing a return, as discussed below.

Figure 4:
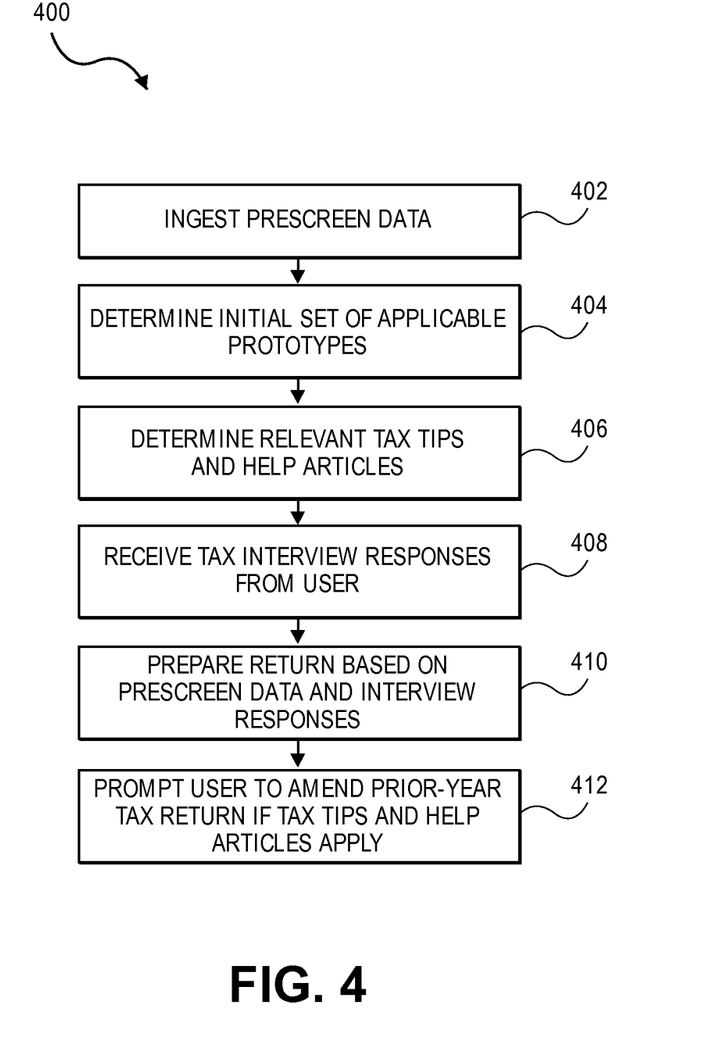
FIG. 4 depicts a flowchart illustrating the operation of another embodiment of the present invention.

Turning now to FIG. 4, a flowchart illustrating the operation of another embodiment of the present invention is depicted, and referred to generally by reference numeral 400. By contrast to method 300, which describes the population of prototype data store 208, method 400 broadly describes the use of prototype data store 208 to determine and present the appropriate set of tax tips and help articles to the user. In some embodiments, method 300 is performed in conjunction with method 400; for example, method 300 may be performed immediately before method 400 every time method 400 is performed. In other embodiments, method 300 is performed periodically (such as daily, weekly, or monthly) to update prototype data store 208, and each of the executions of method 400 uses the most recently updated version of prototype data store 208. In still other embodiments, data store 208 is updated annually based on the returns filed for the previous tax period. In yet other embodiments, method 300 is performed whenever a predetermined number of new returns have been added to prior returns 202.

Method 400 begins at step 402, where prescreen data for the tax return being prepared is ingested. As described above, prescreen data for a given return can take a variety of forms. In some embodiments, prescreen data may be presented to the user for confirmation; for example, the address may be extracted from the return for the previous tax reporting period, and presented to the user for updating if necessary. In some cases, the user may also provide context for the prescreen data; for example, if the user made use of a smartphone application to capture images of tax-relevant receipts over the course of the tax reporting period, these images may be ingested together with the other prescreen data, and presented to the user to categorize as, for example, a business expense or charitable contribution. In some embodiments, prescreen data can be obtained from non-tax sources. For example, the taxpayer's marital status field can be prepopulated based on the "relationship status" field in their social media profile.

Processing then continues at step 404, where classifier 210 determines an initial set of applicable prototypes for the return. Broadly speaking, where prototypes are rules for determining a set of tax tips likely to be helpful for a tax return being prepared, the classifier 210 applies each of these rules to the tax return being prepared to determine an initial set of tax tips and help articles to be presented to the user. As described above, one or more tax tips and/or help articles may be associated with each prototype.

The details of how the classification is performed may vary depending on the algorithms used by statistical analyzer 204. For example, if statistical analyzer 204 uses a density-based clustering algorithm, the return being classified may be given a score for each cluster based on its proximity to the centroid or border of that cluster. Then, any prototypes associated with cluster scores above (or below) a particular threshold are determined to be relevant to the return being prepared. In those embodiments where only a single prototype is associated with each return, the prototype associated with the nearest cluster (i.e. the one with the highest or lowest score) to the return being classified is determined to the applicable prototype for that return. Alternatively, boundaries (either overlapping or mutually exclusive) can be determined for each cluster and the return can be associated with each cluster whose boundaries contain it. In some embodiments, a return being classified may not satisfy the criteria for belonging to any clusters. In such cases, no prototypes or a default prototype may be associated with the return. Once the prototypes associated with the return have been determined, processing proceeds to step 406.

At step 406, the items of tax information (e.g., tax tips and help articles) determined to be relevant are presented to the user during the appropriate portion of the tax interview by user interface engine 216. Tax tips and help articles may be presented to point out the user has missed deductions, incorrectly taken deductions, or any piece of content useful in responding to the tax interview. In some embodiments, relevant tax tips and help articles may not be presented if the user is already in compliance with the tax tip or help article. For example, the system may not present the tax tip described above pointing out that day care expenses are deductible if the user has already claimed a deduction for day care expenses. In some embodiments, tax tips or help articles presented may enable the user to skip entire sections of the tax interview. This may be the case where, for example, a tax tips indicates that a user is not qualified for a certain deduction or need not complete a particular tax schedule.

In some embodiments, the tax tips and help articles presented may also be determined based on the user as well as the taxpayer. For example, a tax professional using the system to prepare a return for a given taxpayer may be presented with more (or more complicated) tax tips and help articles than if the taxpayer preparing their own return. In some embodiments, the skill level of the user preparing the return may be adjusted based on an audit rate for returns prepared by that user, or by received notices of deficiency for those returns. In some embodiments, new or inexperienced users may not be presented with any tax tips or help articles. In some such embodiments, the level of expertise of the users of the system who prepared returns 220 may be used to weight the inputs of statistical analyzer 204 so as to present tax tips and help articles to users of comparable skill levels.

In some embodiments, a user may be able to store tax tips or help articles that they have found helpful for later use, either for the current tax year or for future tax years. These stored tax tips and help articles may either be added to the set of tax tips and help articles to be automatically presented, or made available to the user for convenient recall. Additionally, in some embodiments, the tax tips and help articles may be presented to the user in such a way as to indicate their relative impact. For example, tax tips may be color-coded such that those tips that have a higher impact may be colored red so as to contrast more strongly and be more obvious to the user. Similarly, a numeric or iconic indication of impact may be presented instead. Thus, for a long and complicated help article, a user might be willing to read it if the article is presented as having an impact of "$$$$," but not if the article is presented as having an impact of only "$." One of skill in the art will appreciate that other icons may be used instead or in addition to present different types of impact; for example, time-saving tips can be presented as clock icons, and audit reducing tips can be presented as thermometer or needle gauges indicating the audit risk. It will similarly be clear that these icons can be presented together (where a particular tip may save both money and time) and may be color coded as well.

As part of this process, at step 408, the user provides responses via user interface engine 216 to each question presented in the tax interview. In some embodiments, user interface engine 216 may also present default answers to each question in the interview portion based on the pre-screen data and prior returns 202 which can be affirmed or corrected by the user. In some embodiments, the user may manually search for additional tax tips and help articles regarding the question being presented by user interface engine 216, which can be used to increase the relevancy of tax tips and help articles presented to future users of the system. Any method of presenting questions and receiving responses may be utilized by user interface engine 216 to carry out steps 406 and 408.

As the user enters additional tax data items at step 408, classifier 210 may update the set of applicable prototypes at step 410 and determine that the return being prepared satisfies additional prototypes, or that previously identified prototypes are no longer satisfied. As discussed above, the applicable set of prototypes depends of the values included in the tax data for the relevant indicator variables. Values entered by the user in response to interview questions can provide additional values for indicator variables that could alter the applicability of certain prototypes. Furthermore, the user may correct certain imported prescreen values during the interview process, and this may implicate additional prototypes not previously identified as applicable, or cause prototypes previously identified as applicable to be no longer considered applicable. When this occurs, the tax tips and/or help articles to be presented to the user may change such that more, fewer, or different tax tips and help articles are presented to the user.

Next, at step 410, the tax return preparation engine competes the return based on the prescreen data and the user's responses to the tax interview, as discussed above. In some embodiments, the return may be completed based on the user's final responses, and also based on the user's responses before they were presented with the tax tips and help articles. While only the former of these may be filed, the latter can be used to calculate the total impact of the tax tips and help articles on the return. In this way, the user can be presented with a total amount saved based on the tax tips and help articles.

Finally, at a step 412, the user may be prompted to prepare an amended return for a previous year if a change made in response to a tax tip or help article would also be applicable to a previous year. For example, consider a taxpayer employed as a police officer who has prepared their own taxes using the system for the past two tax years. During the preparation of the most recent tax year's return, the user is prompted for this first time with a tax tip that dry cleaning expenses for their uniforms are deductible. In response to this tip, the user enters dry cleaning expenses and thereby increases their return by $200. Once the return being prepared is complete, the system may determine, based on the prior year's return, that the taxpayer was employed as a police officer for that prior tax year and did not deduct dry cleaning expenses. The user may then be prompted to amend the prior year's tax return to claim the additional deduction for that year as well.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for presenting at least one tax tip or help article to a first user during preparation of a first tax return, comprising one or more non-transitory computer-readable media storing:
   a data store storing a plurality of tax returns from a plurality of users and tax information consulted in preparing the plurality of tax returns;
   a typecasting engine comprising:
      a classifier operable to automatically determine a prototype for the first tax return during the preparation thereof, said prototype based on values of a plurality of indicator variables associated with the first tax return,
      wherein the prototype indicates one or more underlying characteristics associated with the first tax return that inform whether the at least one tax tip or help article is relevant to the current preparation of the first tax return, and
      wherein the plurality of indicator variables corresponds to a respective plurality of tax data items entered on a tax form;
      wherein when a plurality of additional tax returns is added to the data store, the typecasting engine refines the prototype and the plurality of indicator variables; and
   a statistical analyzer operable to analyze the plurality of tax returns and identify the plurality of indicator variables and corresponding prototypes, wherein the plurality of tax returns includes actual returns and training data comprising synthetic returns, wherein the synthetic returns are weighted more heavily than the actual returns;

a data import engine, operable by at least one processor to:
  import tax data items for a taxpayer;
  download one or more tax forms corresponding to the taxpayer; and
  based on at least the tax data items and the one or more tax forms, determine one or more values for the plurality of indicator variables associated with the first tax return; and
a user interface engine operable by the at least one processor to automatically present to the first user, the at least one tax tip or help article selected from a repository of tax information and an indication of an associated impact level or impact type, wherein the at least one tax tip or help article is determined to be relevant to the first user based on the prototype determined by the classifier,
wherein the prototype is based on a positive impact that a presentation of the at least one tax tip or help article had on a prior tax return of the first user or on a prior tax return of another one of the plurality of users, and
wherein determining the prototype comprises applying a statistical cluster analysis to identify the plurality of indicator variables and corresponding prototypes, wherein the cluster analysis comprises biclustering, soft clustering, hard clustering, or density-based clustering.

2. The system of claim 1, wherein the at least one tax tip or help article is presented to the first user only if the first user is not already in compliance with the at least one tax tip or help article.

3. The system of claim 1, wherein the at least one tax tip or help article is related to a deduction available for the first tax return.

4. The system of claim 1, wherein the media further store:
a tax return preparation engine;
wherein the user interface engine is further operable to receive responses from the taxpayer to a tax interview;
wherein the tax return preparation engine is operable to prepare the first tax return based on the imported tax data items, one or more tax forms, and received responses; and
wherein the tax return preparation engine is further operable to prepare an amended tax return for a prior year based on the at least one tax tip or help article.

5. The system of claim 1, wherein the positive impact comprises: reducing tax liability, increasing a taxpayer's refund, decreasing an audit risk, reducing a preparation time for a tax return, or reducing a net tax liability for a future year.

6. The system of claim 1, wherein while the first user is preparing the first tax return in a first interface, the at least one tax tip is presented as a pop-up, fly-out, or other inline presentation in the first user interface.

7. A method of presenting at least one tax tip to a first user during preparation of a first tax return, comprising the steps of:
  importing prescreen data associated with the first tax return being prepared,
  wherein the first tax return is associated with at least one prior tax return;
  comparing said prescreen data to predetermined values for a plurality of indicator variables;
  based on said step of comparing, automatically determining a prototype for a taxpayer associated with the first tax return,
  wherein the prototype is further determined based on inferred information from the prescreen data in combination with additional data from external data sources,
  wherein the prototype indicates one or more underlying characteristics associated with the first tax return that inform whether at least one tax tip is relevant to the current preparation of the first tax return, and
  wherein the plurality of indicator variables corresponds to a respective plurality of tax data items entered on a tax form;
  determining based on the prototype, the at least one tax tip is relevant to the first tax return; and
  presenting to the first user, automatically and without a request from the first user, the at least one tax tip selected from a repository of tax information and an indication of an associated impact level or impact type as a pop-up, fly-out or other inline presentation in a first user interface,
  wherein the at least one tax tip is determined to be relevant to the first user based on the prototype determined,
  wherein the prototype is based on a positive impact that a presentation of the at least one tax tip had on the at least one prior tax return, and
  wherein determining the prototype comprises applying a statistical cluster analysis to identify the plurality of indicator variables and corresponding prototypes, wherein the cluster analysis comprises biclustering, soft clustering, hard clustering, or density-based clustering.

8. The method of claim 7, further comprising the steps of:
  receiving, from the first user, a plurality of responses to a tax interview; and
  preparing, on the basis of the plurality of responses, the first tax return for the taxpayer.

9. The method of claim 8,
  wherein the at least one tax tip affects at least one response to the tax interview; and
  further comprising the step of presenting, to the first user, the impact on the first tax return of the affected at least one response.

10. The method of claim 8, wherein an additional prototype for the first tax return is determined based on the plurality of responses to the tax interview.

11. The method of claim 10, further comprising the step of presenting to the first user, automatically and without a request from the first user, an additional tax tip or help article based on the additional prototype.

12. The method of claim 7, wherein the at least one tax tip is further determined based on a level of tax experience of the first user.

13. The method of claim 7, wherein the positive impact comprises: reducing tax liability, increasing a taxpayer's refund, decreasing an audit risk, reducing a preparation time for a tax return, or reducing a net tax liability for a future year.

14. One or more non-transitory computer-readable media storing computer-executable instructions which, when executed by a computer having at least one processor perform a method of presenting at least one tax tip or help article relevant to a first user during preparation of a first tax return, comprising the steps of:
  importing tax data for the first tax return associated with a taxpayer, wherein the first tax return is associated with a prior tax return and the tax data is imported based at least in part on a predetermined number of associated tax returns;

determining, by at least one processor, a value associated with a plurality of indicator variables for the first tax return based on the tax data;

automatically determining, by the at least one processor, a prototype for the first tax return based at least in part on the value associated with the plurality of indicator variables for the first tax return, wherein determining the prototype is based on using techniques to analyze a plurality of tax returns and identify the plurality of indicator variables and corresponding prototypes, wherein the plurality of tax returns includes actual returns and training data comprising synthetic returns, wherein the synthetic returns are weighted more heavily than the actual returns;

wherein the prototype indicates one or more underlying characteristics associated with the first tax return that inform whether at least one tax tip or help article is relevant to the current preparation of the first tax return, and wherein the plurality of indicator variables corresponds to a respective plurality of tax data items entered on a tax form;

determining via a user interface engine, the at least one tax tip or help article based at least in part on a positive impact of the at least one tax tip or help article on the plurality of returns associated with the prototype;

presenting to the first user via the user interface engine, automatically and without a request from the first user, the at least one tax tip or help article selected from a repository of tax information, and an indication of an associated impact level or impact type of the at least one tax tip or help article, and wherein determining the prototype comprises applying a statistical cluster analysis to identify the plurality of indicator variables and corresponding prototypes, wherein the cluster analysis comprises biclustering, soft clustering, hard clustering, or density-based clustering.

15. The media of claim 14, wherein the impact level or impact type of the relevant tax tip or help article is presented to the first user in the form of an icon.

16. The media of claim 14, wherein the impact level for the relevant tax tip or help article is determined by calculating a change in a refund for each the plurality of returns associated with the prototype obtained by complying with the tax tip or help article.

17. The media of claim 14, wherein the relevant tax tip or help article relates to a deduction available for the tax return or a reduced risk of audit for the tax return.

18. The media of claim 14, wherein the positive impact comprises: reducing tax liability, increasing a taxpayer's refund, decreasing an audit risk, reducing a preparation time for a tax return, or reducing a net tax liability for a future year.

* * * * *